No. 727,372. PATENTED MAY 5, 1903.
S. V. JEFFORDS.
PLOW.
APPLICATION FILED JULY 22, 1902.
NO MODEL.

WITNESSES:
G. P. Kingsbury
Harrison B Brown

INVENTOR
Stephen V. Jeffords
BY Munn & Co.
ATTORNEYS.

No. 727,372. Patented May 5, 1903.

UNITED STATES PATENT OFFICE.

STEPHEN VANRANCLER JEFFORDS, OF WAYCROSS, GEORGIA.

PLOW.

SPECIFICATION forming part of Letters Patent No. 727,372, dated May 5, 1903.

Application filed July 22, 1902. Serial No. 116,553. (No model.)

*To all whom it may concern:*

Be it known that I, STEPHEN VANRANCLER JEFFORDS, of Waycross, in the county of Ware and State of Georgia, have invented certain new and useful Improvements in Plows, of which the following is a specification.

Plows and shovel-cultivators of ordinary construction are not adapted to work small plants, for the reason that with all such known to me prior to my invention the dirt is elevated and practically the whole sod thrown upon the plants, with effect to bend over many of them and mash down others.

It is well known that in working young plants the furrow should be formed as near as possible to the roots. Working close up to the plants with a common shovel or half-shovel cultivator is objectionable, for the reason that the dirt is either thrown beyond the plants or upon them, with the injurious mashing-down or bending-over results above stated. To overcome such objections, I have invented an attachment adapted to be used with any type of plow or shovel-cultivator whereby sliding action of the sod up the plow or cultivator is obstructed, with effect to break and loosen it, the better adapted for hilling up young plants.

In order to enable others to make and use my invention, I will now proceed to describe it in detail with reference to the accompanying drawings, which form a part of my specification, and in which—

Figure 1:
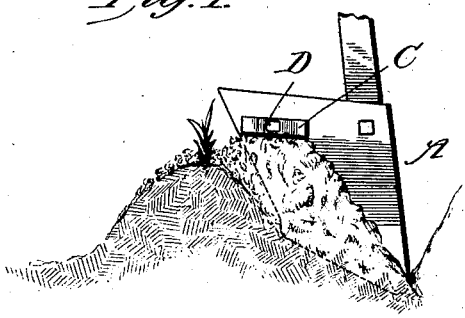
Figure 2:
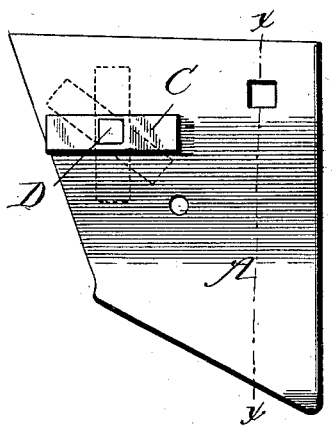
Figure 3:
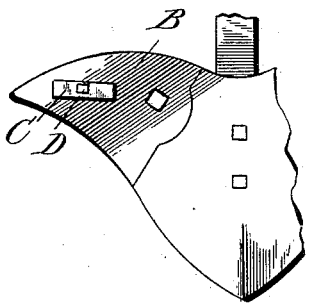
Figure 4:
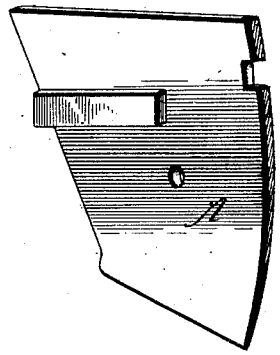

Figure 1 is a view illustrating my invention. Fig. 2 is a front elevation showing my invention applied to a half-shovel plow and dotted to adjusted positions. Fig. 3 is a view showing my invention on one wing of cultivator-plow, the attachment being out of operative position; and Fig. 4 is a sectional view on line $x\ x$ of Fig. 2, showing a modified construction in which the attachment is fixedly secured or formed integral with the plow.

In the drawings, A indicates a half-shovel cultivator-blade, and B a plow-wing, both of which are common and well known.

C denotes my attachment secured in place on the front of a cultivator-blade by a bolt D. The attachment C consists of an elongated angular or other shaped bar, which upon loosening the bolt D may be adjusted from a horizontal to a vertical or other desired position and secured by again tightening up the bolt. Now with the bar C in a horizontal position it is apparent that upward sliding of the dirt on the blade is obstructed, with effect to loosen and break up the sod into condition better adapted for hilling up around the stalks of young plants. In this position of the bar C a furrow may be formed close up to the roots of the plants, since the broken-up sod will fall almost in front of the shovel, and thereby permitting the use of a larger shovel than ordinarily and closer plowing than possible without my attachment, since a large shovel would throw the dirt upon and beyond the plants, as hereinbefore stated. The throw of the dirt can be increased by turning the bar C more or less to a vertical position. When my attachment is arranged lengthwise in line with the travel of the sod, little or no effective obstruction would be offered, and consequently the dirt would be thrown according to the shape or curve of the blade or plow-moldboard.

My invention also comprehends forming plows and cultivator-shovels with a fixed rib integral therewith or secured by any means and the said rib be arranged horizontally or at other desired position.

The bolt D may be tapped into the plow or shovel or pass through and be secured by a nut at the rear side.

It may be desirable to have a series of holes in the plow or shovel, whereby the location of the bar C may be changed, and therefore my invention comprehends such modification.

Having thus fully described my invention, what I claim as new, and desire to secure by Letters Patent, is—

In combination with a plow, a pivoted rib located on the face thereof, substantially as described.

STEPHEN VANRANCLER JEFFORDS.

Witnesses:
C. L. INMAN,
J. W. HIGHSMITH.